Figure 1:
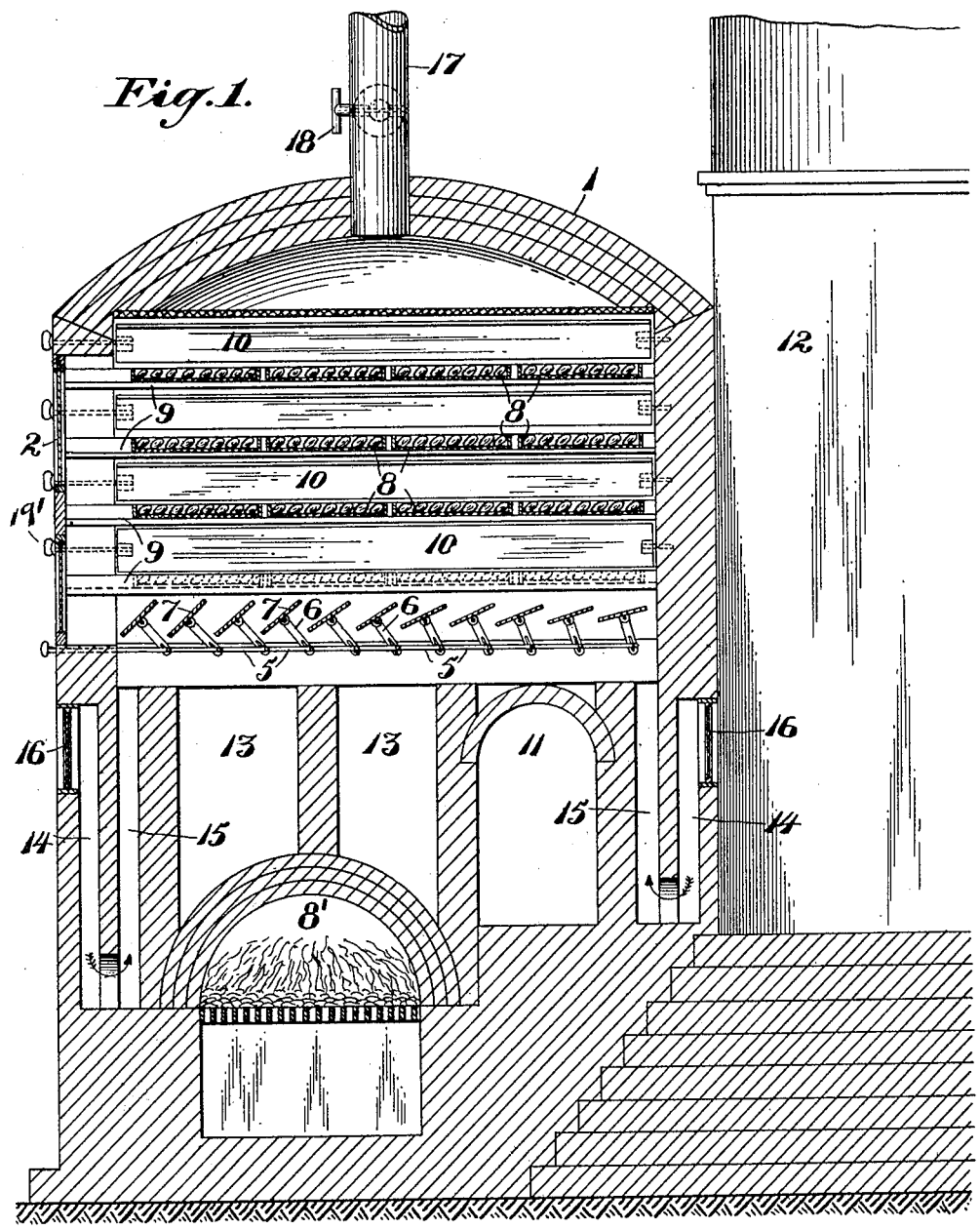

G. E. LINK.
FRUIT DRYING OVEN.
APPLICATION FILED OCT. 30, 1907.

906,639.

Patented Dec. 15, 1908.

3 SHEETS—SHEET 1.

WITNESSES:
F. C. Fiedner
Chas. Sonntag

INVENTOR
George E. Link
BY
Lincoln Sonntag
ATTORNEY

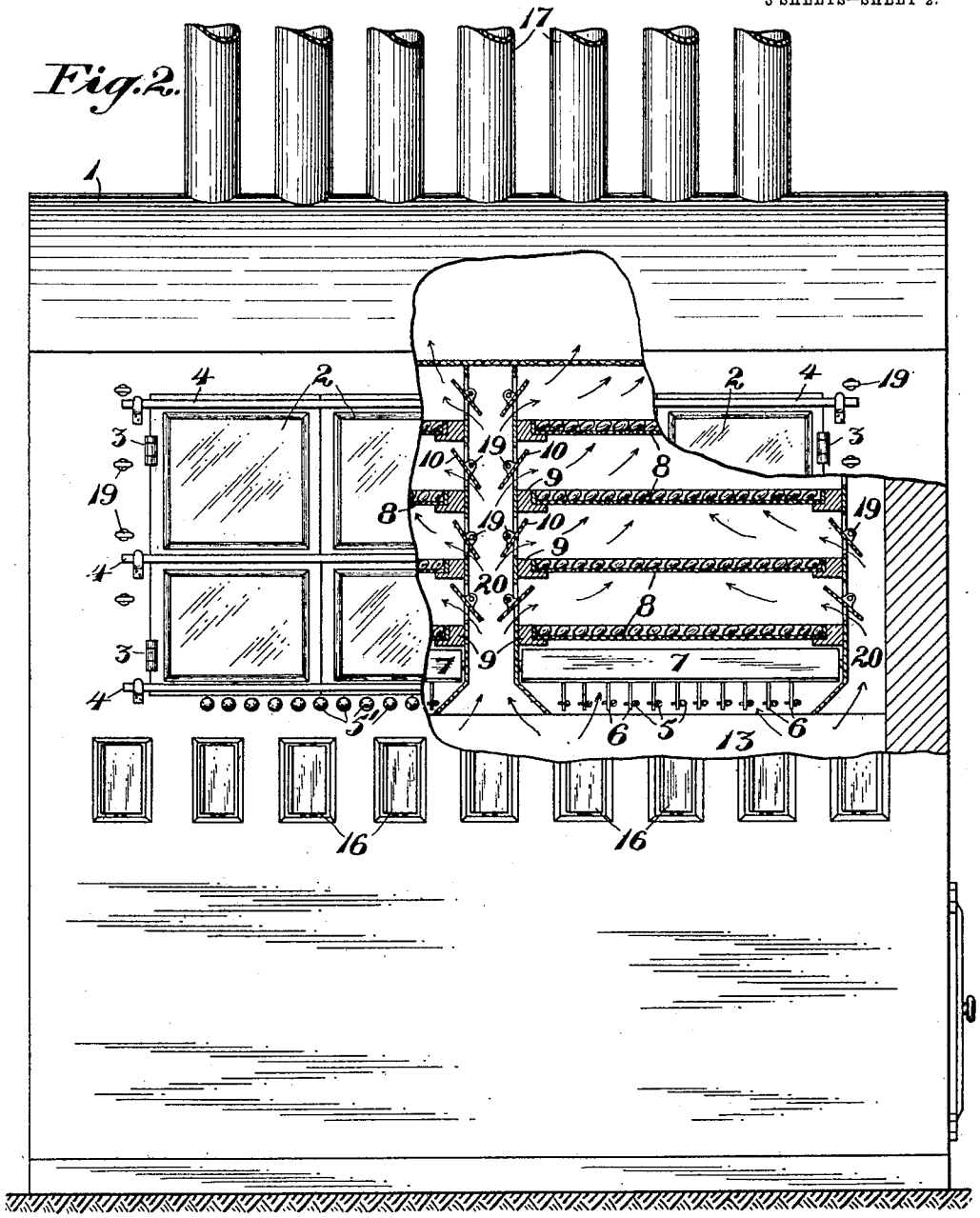

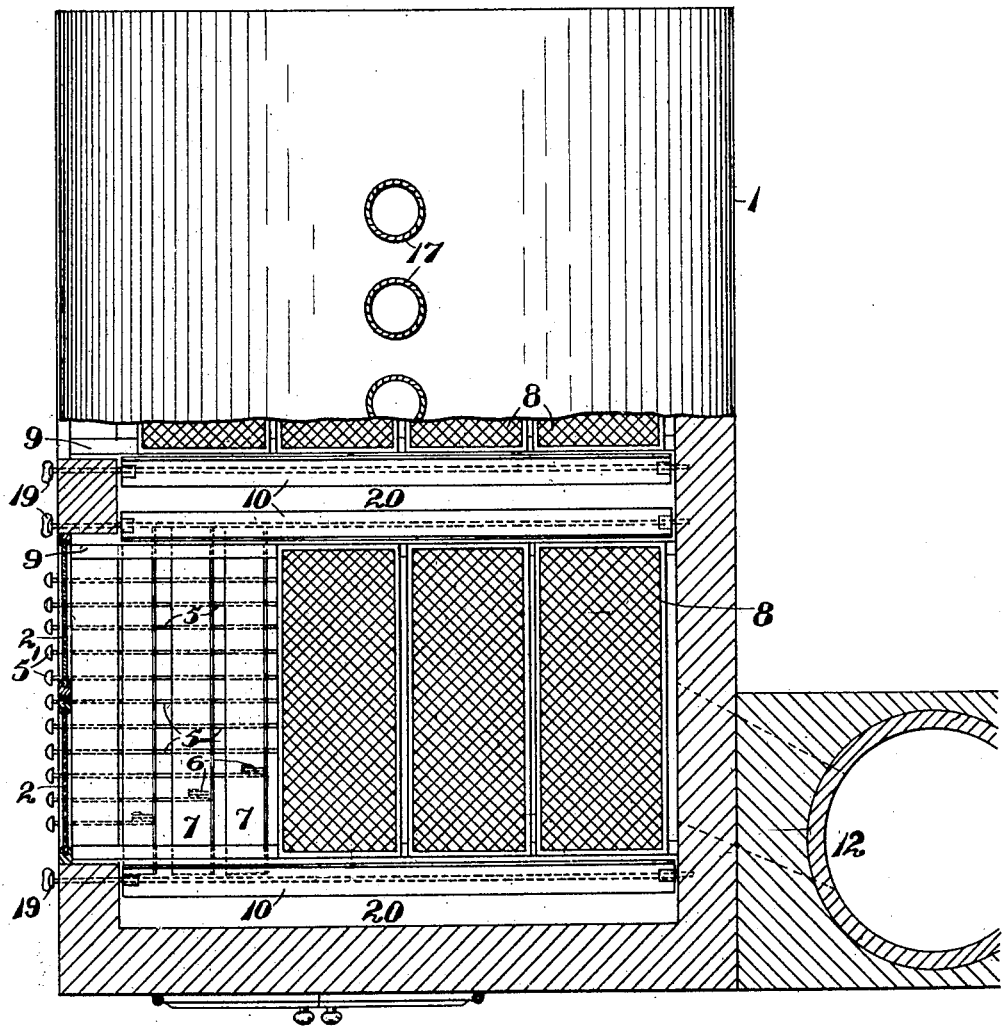

UNITED STATES PATENT OFFICE.

GEORGE E. LINK, OF SAN FRANCISCO, CALIFORNIA.

FRUIT-DRYING OVEN.

No. 906,639.  Specification of Letters Patent.  Patented Dec. 15, 1908.

Application filed October 30, 1907. Serial No. 399,965.

*To all whom it may concern:*

Be it known that I, GEORGE E. LINK, citizen of the United States, residing at San Francisco, in the county of San Francisco and State of California, have invented certain new and useful Improvements in Fruit-Drying Ovens, of which the following is a specification.

My invention relates to improvements in fruit drying ovens and is an improvement on the apparatus shown and described in the drawings and specification forming part of Letters Patent of the United States Number 669,994 issued to me on the nineteenth day of March 1901 for a brick-drying oven so as to peculiarly adapt the same to the drying of fruit.

The object of my invention is to provide improved means for regulating the supply of heat to the fruit in process of drying, for inspecting the fruit during said process without handling the same and in the arrangement of the movable trays therein so as to facilitate the results.

My invention consists in the improved construction and combination of parts shown in the accompanying drawings, described in the following specification and claimed in the appended claims.

Referring to the accompanying drawings Figure 1 is a transverse vertical section of my said improved oven; Fig. 2 is a side view of the same, partially shown in section; and Fig. 3 is a sectional plan view thereof.

In the figures 1 shows the arched oven and 2 the glass doors provided so that the prunes or other fruit contained therein can be inspected exteriorly without disturbing the fruit. The said doors are supported on hinges 3, which may be kept closed by means of the bars 4. The rods 5 are connected to dampers 7 by slotted arms 6 so that the pins as shown on said rods will open said dampers as may be desired or close the same by the longitudinal movement of said rods which may be grasped by means of the knobs 5'. The trays for containing the fruit are shown at 8 and said trays are supported on guides 9. Dampers 10 permit heat to enter the oven from passages 20 which passages allow the ascent of the heat to the entrances regulated by said dampers and said dampers are operated by the turning of the rods 19. Dampers 16 are provided for the cold air passages 14 whereby the supply of air passing therethrough is controlled.

11 shows a flue and the chambers 13 conduct heat upward to the drying chamber.

8' indicates a heating-furnace. Knobs on the ends of rods 19 are indicated by the numerals 19'. The movement of the air from passages 14 is indicated by arrows in the opening in the wall separating passages 14 and 15 in the side walls of the oven, said passages 15 being hot air ducts extending upwardly in to the drying chamber as shown in Fig. 1. The position of the inner walls of passages 15 is such that the heating of the same by the furnace and flue effects the heating of the air passing upwardly therethrough. A series of ventilating chimneys 17 extending through the oven-arch 1 so as to carry off the heated moist air desired to be discharged from the apparatus is provided, dampers such as shown at 18 permitting the discharge to be regulated with exactitude, each of said chimneys being preferably provided with one of said dampers.

12 indicates the vertical smoke stack of the drying oven positioned at one side thereof, carrying off the smoke passing from the furnace 9' and through flue 11 thereto by the opening leading to the same represented by dotted lines in Fig. 3.

As shown in Fig. 2 a series of dampers 16 is provided and which are preferably placed equidistantly and are of sufficient size to permit the entrance of the requisite amount of air. The arrows shown in Fig. 2 suitably illustrate the movement of the heated air for the drying of the fruit positioned on the trays, it circulating on all sides of the fruit by means of the base and side damper-controlled openings and being finally carried off through the ventilating chimneys shown. The passages 20 incline outwardly at their base so as to increase the volume of air entering said passages.

My apparatus is free from complicated arrangements so that an operator can readily acquire the requisite knowledge of the construction and operation of the same so as to secure the best results.

Although I have shown the preferred embodiment of my invention, I am aware that changes may be made in the arrangement or construction of the apparatus and I therefore claim all changes that may fall within its spirit and scope.

Having thus described my invention, what I claim as new and desire to secure by Letters Patent, is:

1. In a fruit drying oven the combination with an elongated drying oven and its furnace and smoke-conducting flues, of side dampers for the admission of cold air, a plurality of base dampers having arms provided with slots, a plurality of rods having pins engaging said arms within said slots, transverse walls contained in said oven forming compartments, said compartments having passages between the same, equidistant guides secured interiorly to said walls, and means for viewing the interior of said oven during the operation of the same.

2. In a fruit drying oven the combination with an elongated drying oven and its furnace and smoke-conducting flues, of side dampers for the admission of cold air, a plurality of base dampers having arms provided with slots, a plurality of rods having pins engaging said arms within said slots, transverse walls contained in said oven forming compartments, said compartments having passages between the same, equidistant guides secured interiorly to said walls, means for operating said dampers exteriorly to the said oven, and means for viewing the interior of said oven during the operation of the same.

3. In a fruit drying oven the combination with an elongated drying oven and its furnace and smoke-conducting flues, of side dampers for the admission of cold air, a plurality of base dampers having arms provided with slots, a plurality of rods having pins engaging said arms within said slots, transverse walls contained in said oven forming compartments, said compartments having passages between the same, and said walls flaring downwardly at their bases, and means for viewing the interior of said oven during the operation of the same.

4. In a fruit drying oven the combination with an elongated drying oven and its furnace and smoke-conducting flues, of side dampers for the admission of cold air, a plurality of base dampers having arms provided with slots, a plurality of rods having pins engaging said arms within said slots, transverse walls contained in said oven, forming compartments, said compartments having passages between the same, and said walls flaring downwardly at their bases, and hinged doors provided with glass for viewing the interior of said oven during the operation of the same.

5. In a fruit drying oven the combination with an elongated drying oven and its furnace and smoke conducting flues, of side dampers for the admission of cold air, a plurality of base dampers provided with central arms having slots, horizontal rods engaging said arms within said slots, transverse walls contained in said oven, forming compartments, said compartments having passages between the same and said walls flaring downwardly at their bases, interior walls each of which is separated from said side dampers by a passage, said walls having apertures extending therethrough, and leading into canals opening upwardly into said oven; and hinged doors provided with glass for viewing the interior of said oven during the operation of the same.

6. In a fruit drying oven the combination with an elongated drying oven and its furnace and smoke conducting flues, of side dampers for the admission of cold air, a plurality of base dampers provided with central arms having slots, horizontal rods engaging the said arms within said slots, transverse walls contained in the said oven, forming compartments, said compartments having passages between the same and said walls flaring downwardly at their bases, dampers opening laterally into said compartments, interior walls each of which is separated from said side dampers by a passage, said walls having apertures extending therethrough and leading into canals opening upwardly into said oven, and hinged doors provided with glass for viewing the interior of said oven during the operation of the same.

7. In a fruit drying oven the combination with an elongated drying oven and its furnace and smoke conducting flues, of side dampers for the admission of cold air, a plurality of base dampers provided with central arms having slots, horizontal rods engaging the said arms within said slots, transverse walls contained in said oven, forming compartments, said compartments having passages between the same, and said walls flaring downwardly at their bases, dampers opening laterally into said compartments, interior walls each of which is separated from said side dampers by a passage, said walls having apertures extending therethrough and leading into canals opening upwardly into said oven, turnable horizontal rods supporting the dampers so opening, and hinged doors provided with glass for viewing the interior of said oven during the operation of the same.

8. In a fruit drying oven the combination with a drying oven and its furnace and smoke conducting and ventilating flues, of side dampers for the admission of cold air, a plurality of base dampers provided with central arms having slots and having horizontal rods in engagement with said arms within said slots, transverse walls contained in said oven, forming compartments, said compartments having passages between the same, and said walls flaring downwardly at their bases, dampers opening laterally into said compartments, interior walls each of which is separated from said side dampers by a passage, said walls having apertures extending therethrough and leading into canals opening upwardly into said oven, and movable doors provided with glass for viewing the interior of said oven during the operation of the same.

9. In a fruit drying oven the combination of an elongated drying oven and its furnace and smoke-conducting flues, of side dampers for the admission of cold air, a plurality of base dampers having arms provided with slots, a plurality of rods having pins engaging said arms within said slots, transverse walls contained in said oven forming compartments, said compartments having passages between the same, side dampers opening into said compartments, guides secured interiorly to said walls and movable means for viewing the interior of said oven during the operation of the same.

10. In a fruit drying oven the combination with a drying oven and its furnace and smoke conducting flues, of side dampers for the admission of cold air, a plurality of base dampers provided with central arms having slots, a plurality of rods engaging said arms within said slots, transverse walls contained in said oven forming compartments, said compartments having passages between the same, guides secured interiorly to said walls, trays positioned on said guides, intermediate chambers for conducting heated air, and movable doors provided with glass for viewing the interior of said oven during the operation of the same.

In testimony whereof I affix my signature in presence of two witnesses.

GEORGE E. LINK.

Witnesses:
  JAS. M. LINK,
  CHAS. T. STANLEY.